(12) United States Patent
Zhao et al.

(10) Patent No.: US 7,656,663 B2
(45) Date of Patent: Feb. 2, 2010

(54) LATCH MECHANISM

(75) Inventors: Peng Zhao, Shenzhen (CN); Chun-Chi Liang, Tu-Cheng (TW); Chien-Li Tsai, Tu-Cheng (TW); Ke-Cheng Lin, Tu-Cheng (TW); Hsuan-Chen Chen, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 285 days.

(21) Appl. No.: 11/309,797

(22) Filed: Sep. 28, 2006

(65) Prior Publication Data

US 2007/0188988 A1    Aug. 16, 2007

(30) Foreign Application Priority Data

Feb. 10, 2006    (CN) .................... 2006 2 0054940

(51) Int. Cl.
*H05K 7/12* (2006.01)

(52) U.S. Cl. .................. 361/679.58; 361/679.09; 292/44

(58) Field of Classification Search ................. 361/683, 361/679.58, 679.09; 292/44
See application file for complete search history.

(56) References Cited

U.S. PATENT DOCUMENTS

| 6,076,869 | A  | * | 6/2000 | Chen et al. ................... 292/202 |
| 6,115,239 | A  |   | 9/2000 | Kim |
| 6,125,040 | A  | * | 9/2000 | Nobuchi et al. ............. 361/726 |
| 7,088,588 | B2 | * | 8/2006 | Lee ............................ 361/725 |
| 7,216,900 | B2 | * | 5/2007 | Liu et al. ...................... 292/98 |
| 7,480,132 | B2 | * | 1/2009 | Wu et al. ................ 361/679.27 |
| 2006/0133019 | A1 | * | 6/2006 | Yamazaki et al. ........... 361/683 |

* cited by examiner

*Primary Examiner*—Jayprakash N Gandhi
*Assistant Examiner*—Ingrid Wright
(74) *Attorney, Agent, or Firm*—Wei Te Chung (57) ABSTRACT

A latch mechanism includes a latching member, a button, and an elastic member for restoring the latching member. The latching member is rotatably installed in a cover unit. The latching member includes a latching portion for engaging with a base unit. The button is movably fixed to the cover unit. The button includes a slanted pushing portion for driving the latching member to rotate for disengaging the latching portion from the base unit.

12 Claims, 6 Drawing Sheets

LATCH MECHANISM

CROSS-REFERENCES TO RELATED APPLICATION

Relevant subject matter is disclosed in the co-pending U.S. patent application Ser. No. 11/309,706, filed on Sep. 15, 2006, and entitled "LATCH MECHANISM FOR FOLDABLE ELECTRONIC DEVICE", which is assigned to the same assignee with this patent application.

FIELD OF THE INVENTION

The present invention relates to a latch mechanism, and more particularly to a latch mechanism for a portable computer.

DESCRIPTION OF RELATED ART

Typically, an electronic device, such as a portable computer, includes a cover unit and a base unit pivotally connected with the cover unit, and a latch mechanism is provided to lock the cover unit to the base unit.

As disclosed in U.S. Pat. No. 6,115,239, a latch mechanism for locking a cover unit to a base unit, includes a latch frame movably installed inside the cover unit, a plurality of latches are formed on the latch frame at predetermined intervals and one end portion of each latch protrudes from a front surface of the cover unit, and a slide knob is operatively connected to the latch frame for concurrently operating the latches. The latches are inserted into and locked by latch grooves formed at positions corresponding to the latches on an upper surface of the base unit. The latches are urged against the base unit by elastic forces applied by double springs mounted on two ends of the latch frame. However, to open the cover unit, the slide knob is slid to overcome the elastic forces of the springs to move the latch mechanism for disengaging from the base unit. The slide force depends on friction between the slide knob and fingers of an operator. It is laborious for an operator to provide enough force to move a slide knob.

What is needed, therefore, is a laborsaving latch mechanism.

SUMMARY OF THE INVENTION

An exemplary latch mechanism includes a latching member, a button, and an elastic member for restoring the latching member. The latching member is rotatably installed in a cover unit. The latching member includes a latching portion for engaging with a base unit. The button is movably fixed to the cover unit. The button includes a slanted pushing portion for driving the latching member to rotate for disengaging the latching portion from the base unit.

Other advantages and novel features will become more apparent from the following detailed description of a preferred embodiment when taken in conjunction with the accompanying drawings, in which:

DETAILED DESCRIPTION OF THE INVENTION

Figure 1:
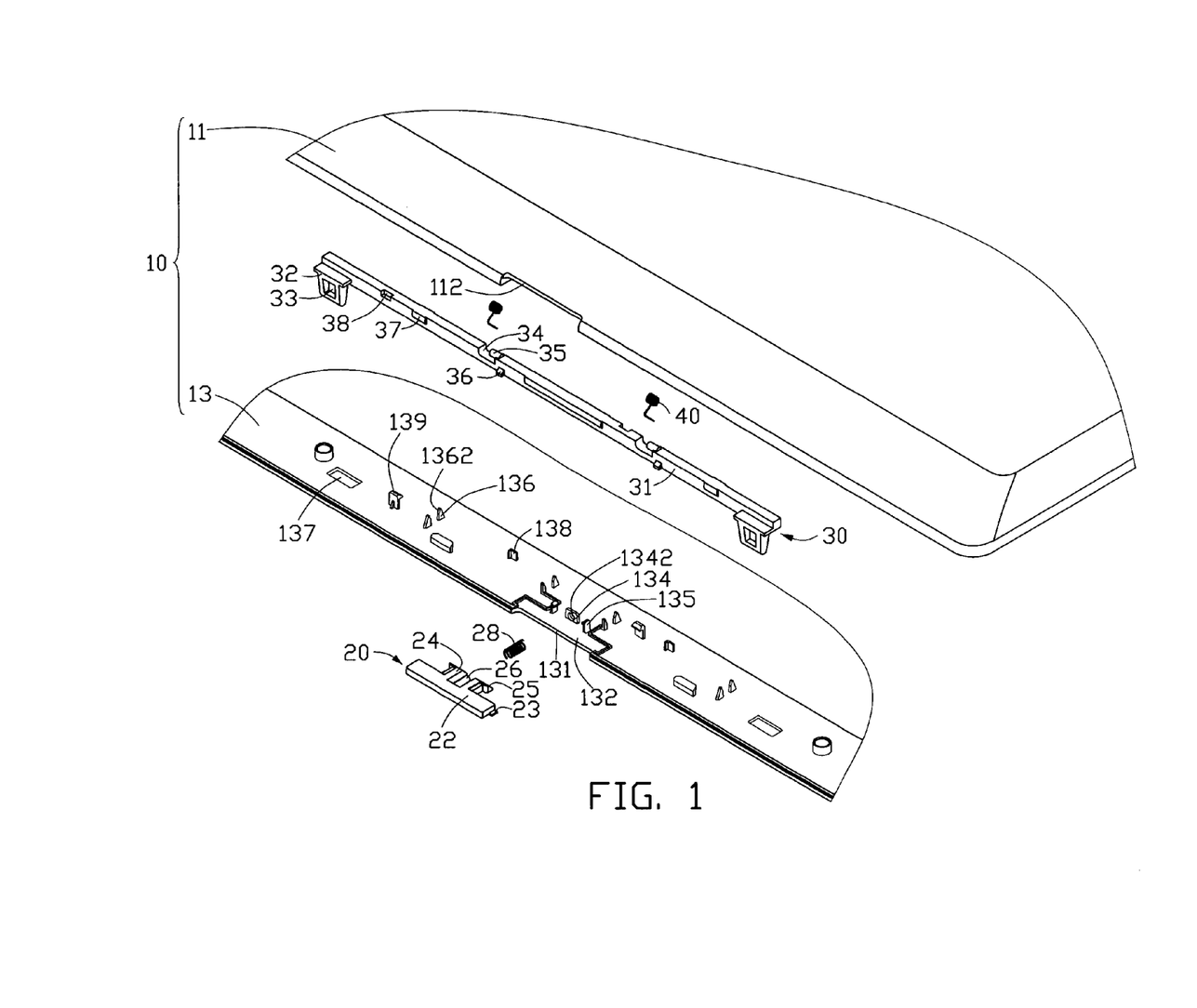
FIG. 1 is an exploded, isometric, inverted view of a latch mechanism with a cover unit in accordance with a preferred embodiment of the present invention, and the cover unit includes a first panel and a second panel.
Figure 2:
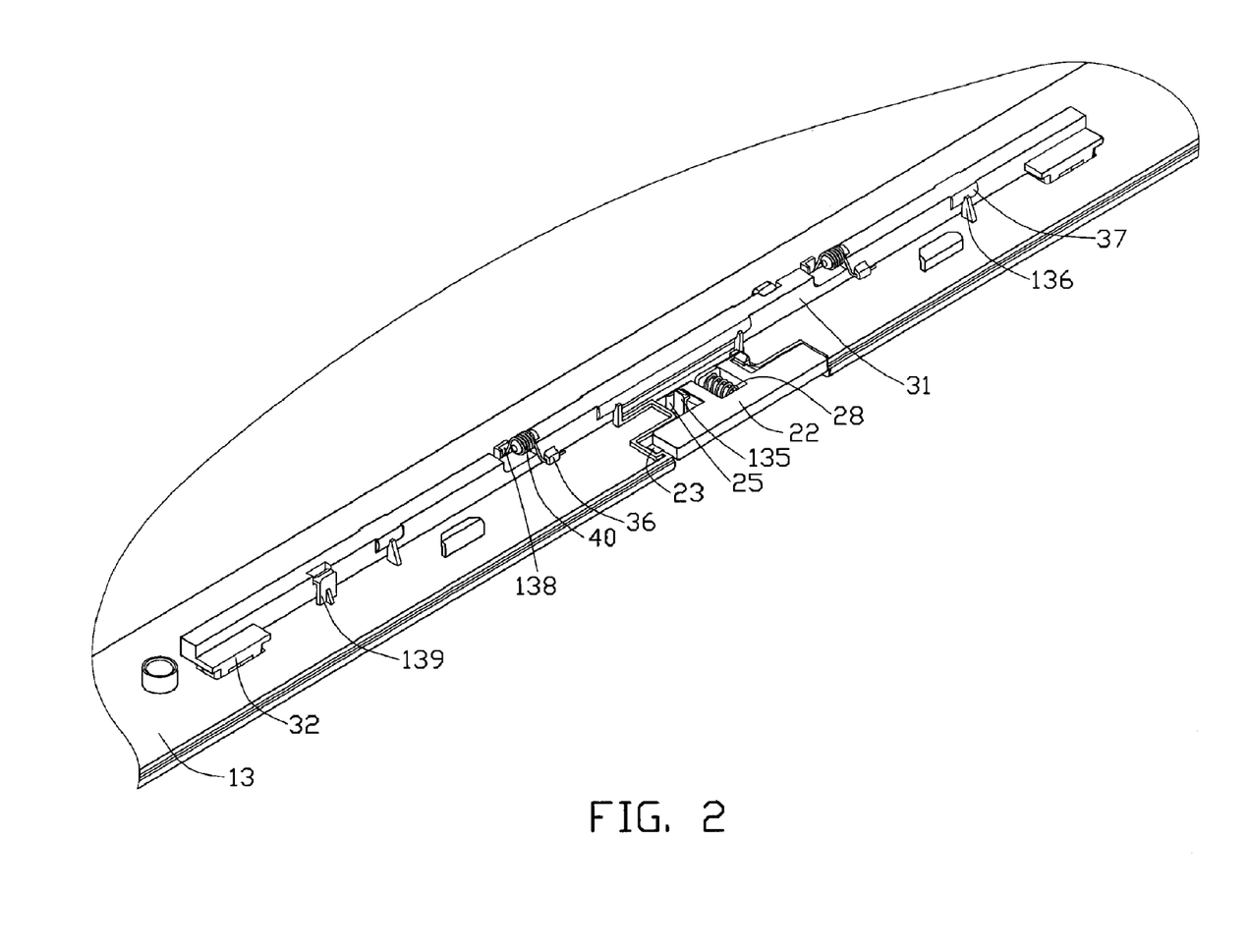
FIG. 2 an enlarged, assembled view of FIG. 1 without the first panel of the cover unit.
Figure 3:
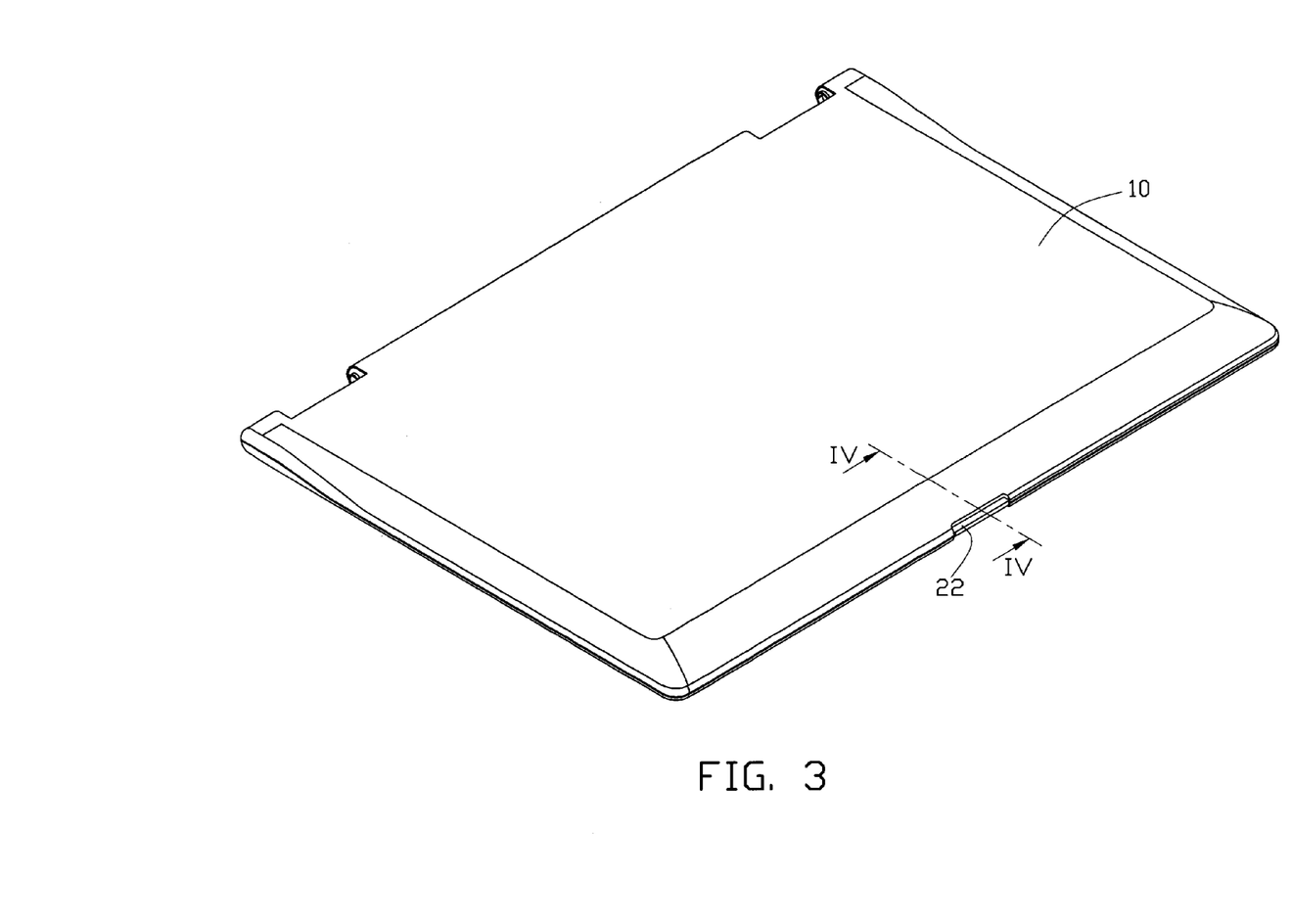
FIG. 3 is an assembled view of FIG. 1.
Figure 6:
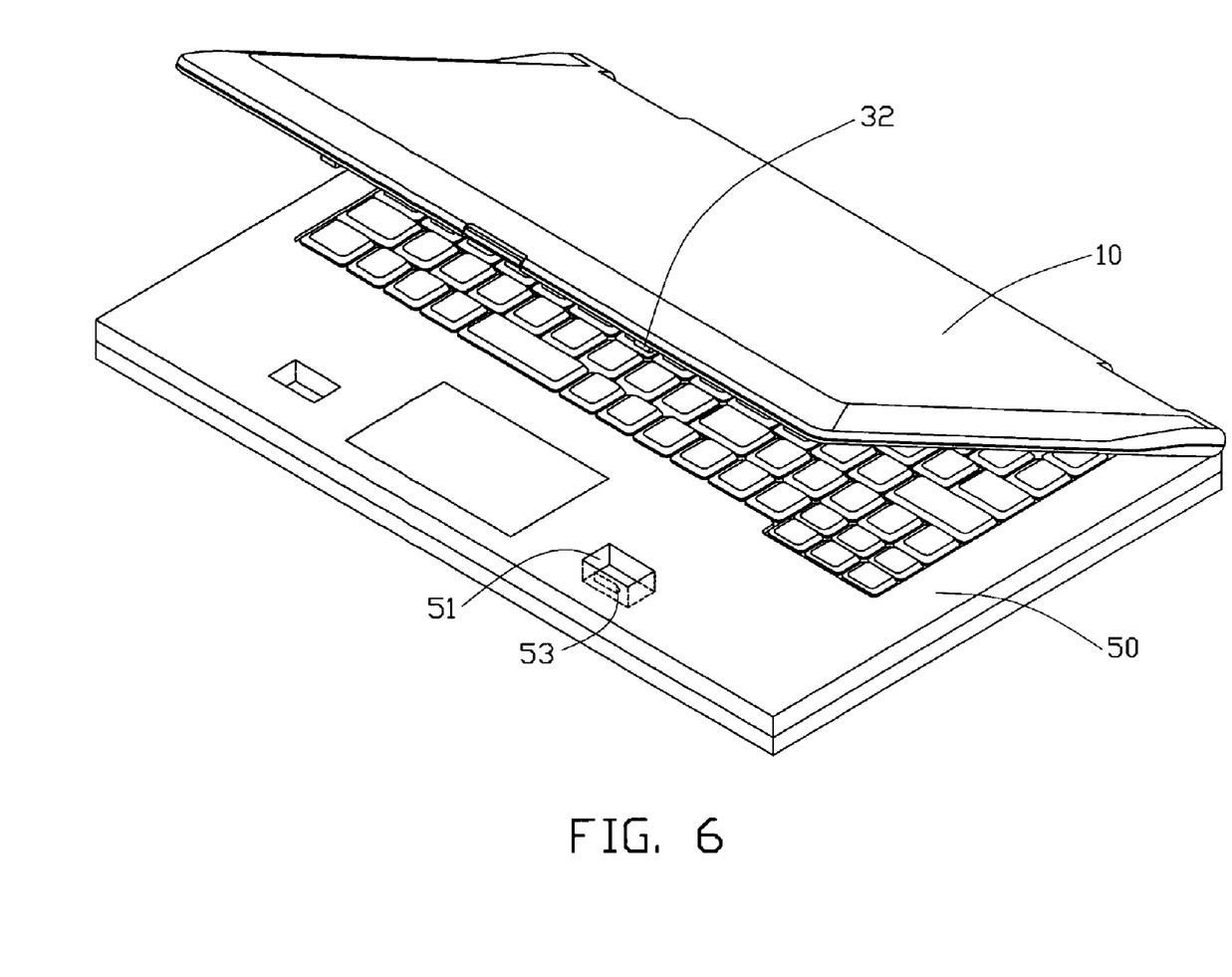
FIG. 6 is a schematic, assembled view of FIG. 1 with a base unit.

Referring to FIGS. 1 to 3, a latch mechanism is provided in accordance with a preferred embodiment of the present invention, for locking a cover unit 10 to a base unit 50 (as shown in FIG. 6) of an electronic device, such as a portable computer. The latch mechanism includes a button 20, a latching member 30, and a pair of elastic members 40. In this embodiment, the elastic members 40 are torsion springs.

The cover unit 10 includes a first panel 11, and a second panel 13 having a pair of through holes 137 defined therein. The second panel 13 holds a liquid crystal display therein. A cutout 131 is defined in the middle of a front edge of the second panel 13, and an inverted T-shaped receiving portion 132 is formed on an inside surface of the second panel 13 communicating with the cutout 131. A stop plate 134 having an aperture 1342 defined therein is perpendicularly formed on a middle section of the receiving portion 132, and parallel to the front edge of the second panel 13. Two spaced hooks 135 are formed on the receiving portion 132 adjacent to two lateral ends of the stop plate 134 respectively. A plurality of pairs of fixing members 136 are formed on the second panel 13 behind the receiving portion 132, and are arranged in a line parallel to the front edge of the second panel 13. Each of the fixing members 136 defines a curved groove 1362, and the grooves 1362 of each pair of the fixing members 136 are opposite to each other. Two spaced fixing plates 138 and two staggered hooking members 139 are formed on the inside surface of the second panel 13 behind the receiving portion 132.

The button 20 includes a pressing portion 22, and two spaced arms 24 extending perpendicularly from a rear end of the pressing portion 22. Two protrusions 23 extend from two lateral ends of the pressing portion 22 respectively. A slanted pushing portion 25 extends from a free end of each arm 24, and a post 26 protrudes from the rear end of the pressing portion 22 between the arms 24.

The latching member 30 includes a main body 31. A pair of latching portions 32 extends down from the main body 31 adjacent to two opposite ends thereof, and each latching portion 32 defines a latching hole 33 from a front portion thereof. Two spaced recesses 34 are defined in a top portion of the main body 31, corresponding to the fixing plates 138 of the second panel 13. A rod 35 extends from the main body 32 in each recess 34. A projection 36 is formed on a front surface of the main body 31 adjacent to each recess 34. A plurality of arcuate flanges 37 is formed on the front surface and a rear surface of the main body 31, corresponding to the grooves 1362 of the fixing members 136 of the second panel 13. Two notches 38 are defined from the top portion to the front surface and the rear surface of the main body 31 respectively, for engaging with the hooking members 139 of the second panel 13 respectively.

Referring further to FIG. 6, the base unit 50 defines a pair of latching slots 51, corresponding to the latching portions 32 of the latching member 30. A slanted block 53 extends into each latching slot 51 from the base unit 50.

Referring also to FIG. 2, in assembly, the latching portions 32 extend through the through holes 137 from the inside surface of the second panel 13. The flanges 37 of the latching member 30 rotatably engage with the grooves 1362 of the fixing members 136 of the second panel 13 respectively, and the hooking members 139 of the second panel 13 engage in the notches 39 of the latching member 30 respectively. After that, the elastic members 40 are placed around the rods 35 adjoining the corresponding recesses 34 of the latching member 30 respectively. One end of each elastic member 40 is fixed to the corresponding projection 36 of the latching member 30, and the other end of each elastic member 40 is fixed to the corresponding fixing plate 138 of the second panel 13. Thereby, the latching member 30 is rotatably mounted on the second panel 13.

An elastic member 28 is placed around the post 26 of the button 20. The button 20 is placed on the receiving portion 132 of the second panel 13, with a free end of the post 26 extending through the aperture 1342 of the stop plate 134 of the second panel 13, the hooks 135 of the second panel 13 engaging with the arms 24 and abutting against the pushing portions 25 of the button 20. The protrusions 23 of the pressing portion 22 of the button 20 abut against the front edge of the second panel 13, and the pressing portion 22 is exposed in the cutout 131 of the second panel 13. Thereby, the button 20 is slidably mounted on the second panel 13. In this embodiment, the elastic member 28 is a coil spring.

Referring also to FIG. 3, the first panel 11 is fixed to the second panel 13 to cover one side of the liquid crystal display, thereby the cover unit 10 is fully assembled.

Figure 4:
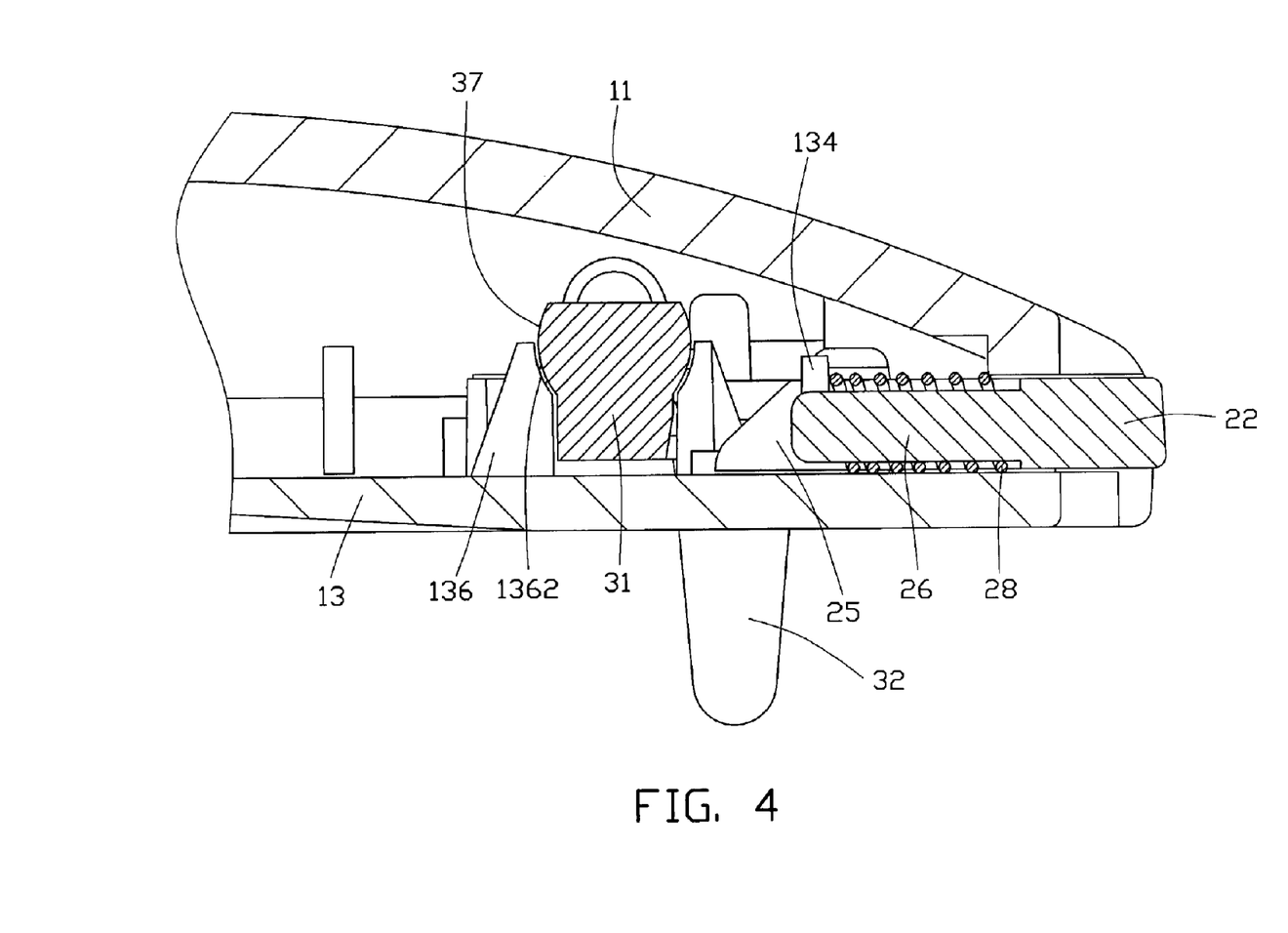
FIG. 4 is a cross-sectional view taken along line IV-IV of FIG. 3.
Figure 5:
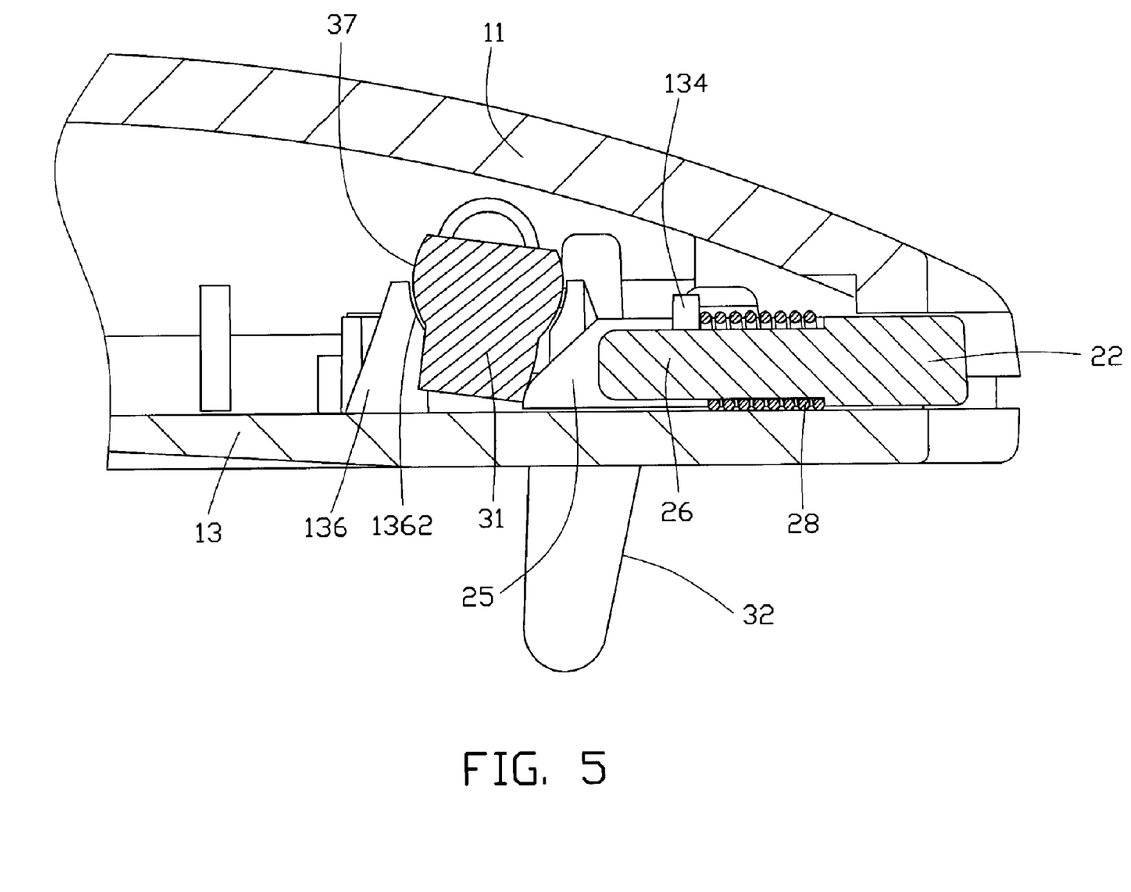
FIG. 5 is similar to FIG. 4, but showing another state of the latch mechanism.

Referring to FIGS. 4 to 6, the cover unit 10 is pivotably attached to the base unit 50. The cover unit 10 is pivoted to cover the base unit 50 when the electronic device is not in use. The latching portions 32 enter the corresponding latching slots 51 of the base unit 50, and bottom surfaces of the latching portions 32 abut against the blocks 53 in the latching slots 51 respectively. The cover unit 10 is further pressed down, the latching portions 32 are pushed backward, and the main body 31 of the latching member 30 is therefore pushed to deform the elastic members 40 and rotate away from a front edge of the cover unit 10 until the blocks 53 of the base unit 50 align with the latching holes 33 of the latching portions 32 respectively. The elastic members 40 are then restored to push the latching member 30 to rotate toward the front edge of the cover unit 10, and the latching portions 32 are therefore rotated toward the blocks 53 and receive the corresponding blocks 53 in the latching holes 33 thereof. Thus, the cover unit 10 is locked to the base unit 50.

Referring further to FIG. 5, to unlock the cover unit 10 from the base unit 50, the pressing portion 22 of the button 20 is pressed to compress the elastic member 28. The pushing portion 25 of the button 20 pushes a bottom portion of the main body 31 of the latching member 30 inward. The main body 31 of the latching member 30 is rotated away from the front edge of the cover unit 10, and the latching portions 32 are rotated inward to disengage from the blocks 53 of the base unit 50 respectively. Thereby, cover unit 10 is ready to be pivoted open.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A latch mechanism for locking a cover unit to a base unit, the latch mechanism comprising:
    a latching member configured to be rotatably installed in the cover unit, a latching portion, immovably extending from the latching member and exposed out of the cover unit all the time, configured for engaging with the base unit;
    a button configured to be movably fixed to the cover unit, the button comprising a slanted pushing portion configured for directly pushing the latching member to rotate for disengaging the latching portion from the base unit; and
    an elastic member for restoring the latching member,
    wherein the cover unit comprises a first panel and a second panel fixed to the first panel, the second panel defines a through hole therein allowing the latching portion of the latching member extending out therefrom, a front edge of the second panel defines a cutout therein, a receiving portion is formed on the second panel communicating with the cutout, the button is slidably received in the receiving portion, and the button comprises a pressing portion exposed in the cutout.

2. The latch mechanism as claimed in claim 1, wherein the elastic member is a torsion spring.

3. The latch mechanism as claimed in claim 1, wherein at least two pairs of fixing members are formed on the second panel, each of the fixing members defines a curved groove, and at least two pairs of arcuate flanges are formed on the latching member for engaging in the corresponding curved grooves.

4. The latch mechanism as claimed in claim 1, wherein the latching member defines two staggered notches therein, and two hooking members are formed on the second panel for engaging in the corresponding staggered notches.

5. The latch mechanism as claimed in claim 1, wherein the latching member defines a recess therein, a projection extends from the latching member adjacent to the recess, a fixing plate is formed on the second panel adjacent to the recess, a rod extends from the latching member toward the recess, and the elastic member is placed around the rod, with two ends of the elastic member fixed to the projection and the fixing plate respectively.

6. The latch mechanism as claimed in claim 1, wherein a stop plate having an aperture is formed on the second panel, and a post protrudes from the pressing portion perpendicularly for extending through the aperture of the stop plate.

7. The latch mechanism as claimed in claim 6, wherein an elastic member is placed around the post between the pressing portion and the stop plate for restoring the button.

8. An electronic device comprising:
    a cover unit;
    a base unit defining a latching slot therein;
    a latching member rotatably installed in the cover unit, the latching member comprising a latching portion for engaging in the latching slot of the base unit;
    a button slidably received in the cover unit and operatively accessible from outside of the cover unit, for driving the latching member to rotate and disengage the latching portion from the latching slot of the base unit; and
    an elastic member for restoring the latching member;
    wherein the cover unit comprises a first panel and a second panel fixed to the first panel, at least two pairs of fixing members are formed on the second panel, each of the fixing members defines a curved groove, and the latching member is rotatably disposed in the curved grooves of the fixing members.

9. The electronic device as claimed in claim 8, wherein the latching member defines a recess therein, a projection extends from the latching member adjacent to the recess, a fixing plate is formed on the second panel adjacent to the recess, a rod extends from the latching member toward the recess, and the elastic member is placed around the rod, with two ends of the elastic member fixed to the projection and the fixing plate respectively.

10. The electronic device as claimed in claim 8, wherein a stop plate having an aperture is formed on the second panel, a post protrudes from the button for extending through the aperture of the stop plate, and an elastic member is placed around the post between the pressing portion and the stop plate for restoring the button.

11. The electronic device as claimed in claim 8, wherein a slanted pushing portion extends from the button for pushing the latching member to rotate.

12. The electronic device as claimed in claim 8, wherein the latching portion defines a latching hole therein, and a block extends into the latching slot from the base unit for engaging in the latching hole of the latching portion.

* * * * *

UNITED STATES PATENT AND TRADEMARK OFFICE
CERTIFICATE OF CORRECTION

PATENT NO. : 7,656,663 B2
APPLICATION NO. : 11/309797
DATED : February 2, 2010
INVENTOR(S) : Zhao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this

Thirtieth Day of November, 2010

David J. Kappos
*Director of the United States Patent and Trademark Office*